United States Patent [19]

Shiraishi et al.

[11] Patent Number: 4,962,167

[45] Date of Patent: Oct. 9, 1990

[54] PROCESS FOR PREPARING ULTRA-HIGH MOLECULAR WEIGHT POLYETHYLENE

[75] Inventors: Takeichi Shiraishi, Kawasaki; Wataru Uchida, Yokohama; Kazuo Matsuura, Higashi-Yukigaya, all of Japan

[73] Assignee: Nippon Oil Company, Limited, Tokyo, Japan

[21] Appl. No.: 271,108

[22] Filed: Nov. 14, 1988

[30] Foreign Application Priority Data

Nov. 13, 1987 [JP] Japan ................... 62-285489

[51] Int. Cl.$^5$ .................. C08F 4/654; C08F 10/02
[52] U.S. Cl. .................... 526/125; 502/127; 526/352
[58] Field of Search ......................... 526/125

[56] References Cited

U.S. PATENT DOCUMENTS

| | | | |
|---|---|---|---|
| 4,296,223 | 10/1981 | Berger | 526/125 |
| 4,306,046 | 12/1981 | Ueno et al. | 526/128 |
| 4,525,552 | 6/1985 | Kuroda et al. | 526/116 |
| 4,786,687 | 11/1988 | Sano et al. | 526/123 |

FOREIGN PATENT DOCUMENTS 58-225105 12/1983 Japan .
2104531 3/1983 United Kingdom .

OTHER PUBLICATIONS

Chemical Abstracts, vol. 95, No. 4, Aug. 1981, p. 19, No. 62291u.
Patent Abstracts of Japan, vol. 11, No. 132, (C-417) [2579], 24th Apr. 1987.

*Primary Examiner*—Edward J. Smith
*Attorney, Agent, or Firm*—Dilworth & Barrese

[57] ABSTRACT

A process for preparing an ultra-high molecular weight polyethylene by the polymerization of ethylene using a catalyst comprising a solid catalyst component and an organometallic compound, characterized in that said solid catalyst component is a product obtained by contacting the following [A] and [B] together:

[A] the reaction product of a magnesium dihalide and a titanium compound represented by the general formula Ti(OR)$_4$ wherein R is a hydrocarbon group having 1 to 20 carbon atoms;

[B] the reaction product of an aluminum trihalide and a silicon compound represented by the general formula Si(OR')$_4$ wherein R' is a hydrocarbon group having 1 to 20 carbon atoms.

9 Claims, No Drawings

PROCESS FOR PREPARING ULTRA-HIGH MOLECULAR WEIGHT POLYETHYLENE

BACKGROUND OF THE INVENTION

The present invention relates to a process for preparing an ultra-high molecular weight polyethylene and more particularly to a process for preparing an ultra-high molecular weight polyethylene superior in fluidity, free of fibril and easy soluble in a solvent by using a specific solid catalyst component and an organometallic compound.

Heretofore, for the preparation of an ultra-high molecular weight polyethylene, there have been known a number of processes each using a catalyst comprising as a carrier an inorganic magnesium compound such as magnesium halide, magnesium oxide or magnesium hydroxide and a transition metal compound such as titanium or vanadium compound supported on the carrier. However, these known processes involve various problems; for example, the resulting ultrahigh molecular weight polyethylene is generally low in bulk density and wide in particle size distribution and the particles thereof are fibrillated so difficult to dissolve in a solvent.

Further, in the production of an ultra-high molecular weight polyethylene fiber according to a gel spinning process which has recently been in increasing demand, it it absolutely necessary to provide an ultra-high molecular weight polyethylene which is easy to dissolve in a solvent and affords a homogeneous gel.

Thus, it has been desired to develop an ultra-high molecular weight polyethylene free of the above-mentioned problems.

It is an object of the present invention to solve the above-mentioned problems.

It is another object of the present invention to provide a process for preparing in high yield an ultra-high molecular weight polyethylene small in average particle size, narrow in particle size distribution, superior in free fluidity, free of fibrillated particles, easy to dissolve in a solvent and suitable for use in gel spinning.

SUMMARY OF THE INVENTION

The present invention resides in a process for preparing an ultra-high molecular weight polyethylene by the polymerization of ethylene using a catalyst comprising a solid catalyst component and an organometallic compound, characterized in that the said solid catalyst component is a product obtained by contacting the following [A] and [B] together:

[A] the reaction product of a magnesium dihalide and a titanium compound represented by the general formula $Ti(OR)_4$ wherein R is a hydrocarbon group having 1 to 20 carbon atoms;

[B] the reaction product of an aluminum trihalide and a silicon compound represented by the general formula $Si(OR')_4$ wherein R' is a hydrocarbon group having 1 to 20 carbon atoms.

By using such specific catalyst according to the present invention there can be obtained an ultra-high molecular weight polyethylene having the following superior characteristics:

(1) Small average particle size; generally spherical, having a narrow particle size distribution; and high free fluidity.

(2) The particles are free of fibril and easy to dissolve in a solvent.

(3) Because of the above characteristics (1) and (2), in producing an ultra-high molecular weight polyethylene fiber according to a gel spinning process, the amount of a solvent required is small and there is obtained a homogeneous gel.

DETAILED DESCRIPTION OF THE INVENTION

The magnesium dihalide used in the present invention is substantially anhydrous. Examples are magnesium difluoride, magnesium dichloride, magnesium dibromide, magnesium diiodide, and mixtures thereof, with magnesium dichloride being particularly preferred. These magnesium dihalides may have been treated with electron donors such as, for example, alcohols, esters, ketones, carvoxylic acids, ethers, amines and phosphines.

As the titanium compound there is used a compound represented by the general formula $Ti(OR)_4$ wherein R is a hydrocarbon group having 1 to 20, preferably 1 to 8, carbon atoms such as, for example, an alkyl, aryl or aralkyl group. Examples are tetramethoxytitanium, tetroethoxytitanium, tetraisopropoxytitanium, tetrapropoxytitanium, tetrabutoxytitanium, tetrapentoxytitanium, and tetraphenoxytitanium, with tetrabutoxytitanium being preferred.

The method for reaction of the magnesium dihalide with the titanium compound is not specially limited, but according to a preferred method, both are mixed and reacted under heating at a temperature of 20°-200° C., preferably 50°-200° C., for 5 minutes to 10 hours, preferably 10 minutes to 2 hours, in an inert hydrocarbon solvent (e.g., hexane, heptane, toluene, or cyclohexane). Of course, these operations should be performed in an inert gas (e.g. nitrogen or helium) and moisture should be avoided as far as possible.

The reaction ratio of the magnesium dihalide to the titanium compound is in the range of 0.05 to 10, preferably 0.1 to 5, in terms of Mg/Ti (mole ratio).

The aluminum trihalide used in the present invention is substantially anhydrous. Examples are aluminum trifluoride, aluminum trichloride, aluminum tribromide, aluminum triiodide, and mixtures thereof, with aluminum trichloride being particularly preferred.

As the silicon compound there is used a compound represented by the general formula $Si(OR')_4$ wherein R' is a hydrocarbon group such as an alkyl, aryl or aralkyl group having 1 to 20, preferably 1 to 10 carbon atoms. Examples are $Si(OCH_3)_4$, $Si(OC_2H_5)_4$, $Si(On-C_3H_7)_4$, $Si(On-C_4H_9)_4$, $Si(O-C_8H_{17})_4$ and $Si(OC_{10}H_{21})_4$, with $SI(OC_2H_5)_4$ being particularly preferred.

The method for reaction of the aluminum trihalide with the silicon compound is not specially limited, but according to a preferred method, both are mixed and reacted under heating at a temperature of 20°-200° C., preferably 50°-200° C., for 5 minutes to 10 hours, preferably 10 minutes to 2 hours, in an inert hydrocarbon solvent (e.g., hexane, heptane, toluene, or cyclohexane). Of course, these operations should be conducted in an inert gas (e.g., nitrogen or helium) and moisture should be avoided as far as possible.

The reaction ratio of the aluminum trihalide to the silicon compound is in the range of 0.01 to 10, preferably 0.1 to 5.

The solid catalyst component used in the invention is obtained by mutual contact of [A] the reaction product of the magnesium dihalide and the titanium compound Ti(OR)$_4$ and [B] the reaction product of the aluminum trihalide and the silicon compound Si(OR')$_4$. As to the reaction sequence, component [B] may be added into component [A], or component [A] into component [B], to allow both to be contacted together. The latter, namely, addition of component [A] into component [B], is preferred.

The method of contacting components [A] and [B] is not specially limited, but according to a preferable method, both are mixed under heating at a temperature of 20°–200° C., preferably 50°–200° C., for 5 minutes to 10 hours, preferably 10 minutes to 2 hours, in an inert hydrocarbon solvent (e.g., hexane, heptane, toluene, or cyclohexane), followed by washing with an inert hydrocarbon solvent. Of course, these operations should be conducted in an inert gas (e.g., nitrogen or helium) moisture should be avoided as far as possible.

The amount of component [B] used in the invention is in the range of 0.01 to 10 g, preferably 0.5 to 5 g, per gram of component [A]. The solid catalyst component thus obtained is used in combination with an organometallic compound in the preparation of an ultra-high molecular weight polyethylene.

As to the organometallic compound used in the present invention, there may be employed an organometallic compound of a metal of Groups I-IV in the Periodic Table which is known as a component of a Ziegler type catalyst. Particularly preferred are organoaluminum compounds and organozinc compounds. To illustrate these compounds, mention may be made of organoaluminum compounds of the general formulae R$_3$Al, R$_2$AlX, RalX$_2$, R$_2$AlOR, Ral(OR)X and R$_3$Al$_2$X$_3$ wherein R, which may be the same or different, is an alkyl or aryl group having 1 to 20 carbon atoms and X is a halogen atom, as well as organozinc compounds of the general formula R$_2$Z$_n$ wherein R, which may be the same or different, is an alkyl group having 1 to 20 carbon atoms. Concrete examples are triethylaluminum, triisopropylaluminum, triisobutylaluminum, tri-sec-butylaluminum, tri-tert-butylaluminum, trihexylaluminum, trioctylaluminum, diethylaluminum chloride, diisopropylaluminum chloride, diethylaluminum ethoxide, ethylaluminum sesquichloride, diethylzinc, and mixtures thereof. It is preferable to use triethylaluminum and diethylaluminum chloride in combination.

The amount of the organometallic compound used is not specially limited. But usually it is in the range of 0.1 to 1,000 moles per mole of the titanium compound.

It is also preferable in the present invention that the organometallic compound component be used as a mixture or addition compound of the organometallic compound and an organic acid ester.

Where the organometallic compound component is used as a mixture of the organometallic compound and an organic acid ester, the organic acid ester is used usually in an amount of 0.1 to 1 mole, preferably 0.2 to 0.5 mole, per mole of the organometallic compound. Where it is used as an addition compound of the organometallic compound and the organic acid ester, the molar ratio is preferably in the range of 2:1 to 1:2.

The organic acid ester is the ester of a saturated or unsaturated, mono- or dibasic organic carboxylic acid having 1 to 24 carbon atoms and an alcohol having 1 to 30 carbon atoms. Examples are methyl formate, ethyl acetate, amyl acetate, phenyl acetate, octyl acetate, methyl methacrylate, ethyl stearate, methyl benzoate, ethyl benzoate, n-propyl benzoate, iso-propyl benzoate, butyl benzoate hexyl benzoate, cyclopentyl benzoate, cyclohexyl benzoate, phenyl benzoate, benzoic acid 4-tolyl, methyl salicylate, ethyl salicylate, methyl p-hydroxybenzoate, ethyl p-hydroxybenzoate, phenyl salicylate, cyclohexyl p-hydroxybenzoate, benzyl salicylate, ethyl α-resorcinol carboxylate, methyl anisate, ethyl anisate, phenyl anisate, benzyl anisate, methyl p-ethoxybenzoate, methyl p-toluylate, ethyl p-toluylate, phenyl p-toluylate, ethyl o-toluylate, ethyl m-toluylate, methyl p-aminobenzoate, ethyl p-aminobenzoate, vinyl benzoate, allyl benzoate, benzyl benzoate, methyl naphthoate, and ethyl naphthoate.

Particularly preferred are alkyl esters, especially methyl and ethyl esters, of benzoic acid, o- or p-toluic acid and anisic acid.

The polymerization using the catalyst of the present invention can be performed in the form of slurry polymerization, solution polymerization or vapor phase polymerization. The catalyst used in the present invention is particularly suitable for slurry phase polymerization.

Ethylene is polymerized in a substantially oxygen- and water-free condition, in the presence of an inert hydrocarbon, at a hydrogen concentration of 0 to 20, preferably 0 to 10, mole %, at a temperature of 0° to 120°, preferably 20° to 100° C., and a pressure of 0 to 70, preferably 0 to 60, kg/cm$^2$.G. As examples of the inert hydrocarbon are mentioned saturated hydrocarbons such as butane, pentane, hexane, heptane, octane and cyclohexane, and aromatic hydrocarbons such as benzene, toluene and xylene. Where required in molding the resulting ultra-high molecular weight polyethylene, there also may be used high boiling, organic solvents such as decalin, tetralin, decane and kerosene.

According to such a process of the present invention there is obtained an ultra-high molecular weight polyethylene having an intrinsic viscosity of 6 to 50 dl/g, preferably 8 to 30 dl/g, more preferably 9 to 28 dl/g, in decalin at 135° C., and a molecular weight of 600,000 to 12,000,000, preferably 900,000 to 6,000,000, more preferably 1,200,000 to 5,000,000.

The molecular weight can be adjusted to some extent by changing polymerizing conditions such as the polymerization temperature and the catalyst mole ratio. The addition of hydrogen into the polymerization system is more effective for this purpose. Of course, using the catalyst of the present invention, there may be performed, without any trouble, a multi-stage polymerization reaction involving two- or more-stage reactions and different polymerizing conditions such as different hydrogen concentrations and different polymerization temperatures.

Further, for the purpose of modifying the ultra-high molecular weight polyethylene of the present invention, one or more α-olefins or dienes may be copolymerized with ethylene. Examples of α-olefins include propylene, butene-1, hexene-1 and 4-methylpentene-1, while examples of dienes include butadiene, 1,4-hexadiene, ethyl norbornene and dicyclopentadiene.

According to such a process of the present invention there can be obtained an ultra-high molecular weight polyethylene having a small average particle diameter, a narrow particle size distribution, good free fluidity, having no fibrillated particles, and easy to dissolve in a solvent.

The following examples are given to illustrate the present invention concretely, but the invention is not limited thereto.

EXAMPLE 1

(a) Preparation of Solid Catalyst Component 1.9 g of MgCl$_2$ and 13.6 ml of tetrabutoxytitanium were placed in a thoroughly dried, 100 ml flask in a nitrogen atmosphere and reaction was allowed to take place at 90° C. for 2 hours under stirring. The reaction product thereby obtained will hereinafter be referred to as component [A].

20 g of AlCl$_3$ and 30 ml of n-heptane were placed in a thoroughly dried, 300 ml flask in a nitrogen atmosphere, then 40 ml of Si(OC$_2$H$_5$)$_4$ was slowly added dropwise and the temperature was raised to 80° C., at which reaction was allowed to take place for 2 hours, followed by slow cooling down to 40° C. The reaction product thus obtained will hereinafter be referred to as component [B].

While component [B] was stirred at 40° C., component [A] was slowly added dropwise into component [B]. Thereafter, the temperature was returned to room temperature and the supernatant liquid was removed by decantation, followed by washing with five 200 ml portions of hexane to obtain a solid catalyst component containing 1.7 wt% of titanium.

(b) Polymerization of Ethylene 1,000 ml of hexane, 1.0 mmol of triethylaluminum, 1.0 mmol of diethylaluminum monochloride, and 10 mg of the solid catalyst component prepared above were charged in this order into a 2-liter autoclave at room temperature in a nitrogen atmosphere. Thereafter, the temperature was raised to 70° C. and ethylene was introduced to a total pressure of 10 kg/cm$^2$.G, at which temperature and pressure there was conducted polymerization for 1 hour to obtain an ultra-high molecular weight polyethylene. Catalytic activity was 5,500g.polyethylene/g.solid catalyst.hr.C$_2$H$_4$ pressure.

(c) Evaluation of Physical Properties

As a result of evaluation of physical properties according to conventional methods, the ultra-high molecular weight polyethylene thus prepared was found to have a bulk density of 0.34 g/cm$^3$, an intrinsic viscosity (in decalin at 135° C.) of 16.6 dl/g, an average particle diameter of 245 µm and good free fluidity. When it was observed through an electron microscope of 3,000 magnification, there was recognized no fibril.

· The solubility in an organic solvent was evaluated in terms of variations in intrinsic viscosity of the polymer in decalin at 135° C. More specifically, 0.02 g of the polymer prepared above was added to 20 ml of decalin and ditertiary butyl hydroxytoluene was added as an antioxydant at a proportion of 0.25 wt% based on the weight of the polymer. This polymer solution was held at 140° C. for 3 hours in a constant temperature bath and then held at 135° C. for 1 hour in a viscosity measuring constant temperature bath, thereafter measured for viscosity a 135° C. The viscosity measurement was made in the following manner. 20 ml of the polymer solution was transferred into a viscosimeter and drop time was measured three times, then 10 ml of decalin was added and the same operation was repeated, thereafter another 10 ml of decalin was added and the same operation was repeated. Thereafter, the polymer solution was replaced by a fresh polymer solution and drop second was measured again in the same manner as above. These operations were repeated five times and for each time there was calculated [η] from a mean value of drop seconds. With the result as a degree of variations, there was calculated standard deviation/mean value (CV value, %). The CV value thus calculated was 2.4%, providing that the solubility of the polymer was extremely high.

Table 1 shows the results of the evaluation of physical properties.

EXAMPLE 2

An experiment was conducted in the same way as in Example 1 except that the amount of AlCl$_3$ in component [B] was changed to 10 g. The resultant polyethylene was evaluated for physical properties; the results are as shown in Table 1.

EXAMPLE 3

An experiment was conducted in the same way as in Example 1 except that the amount of AlCl$_3$ and that of Si(OC$_2$H$_5$)$_4$ in component [B] were changed to 10 g and 30 ml, respectively. The resultant polyethylene was evaluated for physical properties; the results are as shown in Table 1.

EXAMPLE 4

An experiment was conducted in the same way as in Example 1 except that the amount of tetrabutoxytitanium in component [A] was changed to 54.4 ml. The resultant polyethylene was evaluated for physical properties; the results are as shown in Table 1.

COMPARATIVE EXAMPLE 1

An experiment was conducted in the same way as in Example 1 except that 13.6 ml of tetrabutoxytitanium alone was used without using MgCl$_2$ in component [A]. Physical properties of the resultant polyethylene were evaluated and the results are set out in Table 1.

COMPARATIVE EXAMPLE 2

An experiment was conducted in the same way as in Example 1 except that 40 ml of Si(OC$_2$H$_5$)$_4$ alone was used without using AlCl$_3$ in component [B] and n-heptane. Physical properties of the resultant polyethylene were evaluated and the results are set out in Table 1.

COMPARATIVE EXAMPLE 3

An experiment was conducted in the same way as in Example 1 except that Si(OC$_2$H$_5$)$_4$ in component [B] was changed to 40 ml of SiCl$_4$. Physical properties of the resultant polyethylene were evaluated and the results are set out in Table 1.

COMPARATIVE EXAMPLE 4

(a) Preparation of Solid Catalyst Component 10 g of MgCl$_2$ and TiCl$_4$ in an amount corresponding to 40 mg in terms of titanium supported were placed in a thoroughly dried, 400 ml stainless steel ball milling pot in a nitrogen atmosphere and pulverized by ball milling for 16 hours to obtain solids. 10 g of the solids was slurried in hexane and the component [B] described in Example 1 was slowly added dropwise into the slurry at 40° C. under stirring. Thereafter, the temperature was returned to room temperature and the supernatant liquid was removed by decantation, followed by washing with five 200 cc portions of hexane to obtain a solid catalyst component containing 3.2 wt% of titanium.

(b) Polymerization of Ethylene

Ethylene polymerization was performed in the same manner as in Example 1 except that the solid catalyst component used therein was replaced by the solid catalyst component just prepared above. The resultant polyethylene was evaluated for physical properties; the results are as set forth in Table 1.

COMPARATIVE EXAMPLE 5

The procedure of Example 1 was repeated except that $MgCl_2$ in component [A] was changed to MgO. The resultant polyethylene was evaluated for physical properties; the results are as set forth in Table 1.

COMPARATIVE EXAMPLE 6

The procedure of Example 1 was repeated except that $Si(OC_2H_5)_4$ in component [B] was not used. The resultant polyethylene was evaluated for properties; the results are as set forth in Table 1.

formula $Ti(OR)_4$ wherein R is a hydrocarbon group having 1 to 20 carbon atoms;

(B) the reaction product of an aluminum trihalide and a silicon compound represented by the general formula $Si(OR')_4$ wherein R' is a hydrocarbon group having 1 to 20 carbon atoms.

2. A process as set forth in claim 1, wherein the magnesium dihalide is magnesium dichloride.

3. A process as set forth in claim 1, wherein the magnesium dihalide has been treated with an electron donor.

4. A process as set forth in claim 1, wherein R is an alkyl, aryl or aralkyl group having 1 to 8 carbon atoms.

5. A process as set forth in claim 1, wherein R' is an alkyl, aryl or aralkyl group having 1 to 10 carbon atoms.

6. A process as set forth in claim 1, wherein the ratio of the magnesium dihalide to the titanium compound is in the range of 0.05 to 10 in terms of Mg/Ti mole ratio.

7. A process as set forth in claim 1, wherein the ratio of the aluminum trihalide to the silicon compound is in

TABLE 1

| | Solid Catalyst Component | | | | Evaluation Results of Physical Properties | | | | | |
|---|---|---|---|---|---|---|---|---|---|---|
| | $MgCl_2$ (g) | Tetrabutoxy-titanium (ml) | $AlCl_3$—$Si(OC_2H_5)_4$ | | Catalytic Activity g · PE/g · solid catalyst hr · $C_2H_4$ pressure | Bulk Density (g/cm$^3$) | Average Particle Diameter (μm) | Intrinsic Viscosity (dl/g) | CV Value | Fibril |
| | | | (g) | (ml) | | | | | | |
| Ex. 1 | 1.9 | 13.6 | 20 | 40 | 5500 | 0.34 | 245 | 16.60 | 2.4 | Not formed |
| Ex. 2 | 1.9 | 13.6 | 10 | 40 | 4400 | 0.31 | 230 | 16.00 | 2.7 | Not formed |
| Ex. 3 | 1.9 | 13.6 | 10 | 30 | 4800 | 0.30 | 195 | 16.10 | 2.5 | Not formed |
| Ex. 4 | 1.9 | 54.4 | 20 | 40 | 5350 | 0.33 | 210 | 16.02 | 2.9 | Not formed |
| Comp. Ex. 1 | 0 | 13.6 | 20 | 40 | 100 | 0.15 | 270 | 20.00 | 6.2 | Formed |
| Comp. Ex. 2 | 1.9 | 13.6 | 0 | 40 | 50 | 0.11 | 300 | 21.00 | 6.3 | Formed |
| Comp. Ex. 3 | 1.9 | 13.6 | 20 | 40(*1) | 4900 | 0.34 | 350 | 16.05 | 6.5 | Formed |
| Comp. Ex. 4 | 10 | 1.1(*2) | 20 | 40 | 1000 | 0.19 | 360 | 16.40 | 6.0 | Formed |
| Comp. Ex. 5 | 1.9(*3) | 13.6 | 20 | 40 | 500 | 0.20 | 350 | 18.00 | 6.4 | Formed |
| Comp. Ex. 6 | 1.9 | 13.6 | 20 | 0 | 4000 | 0.29 | 360 | 16.00 | 6.1 | Formed |

(*1) using $SiCl_4$,
(*2) using $TiCl_4$,
(*3) using MgO

We claim:

1. A process for preparing an ultra-high molecular weight polyethylene having an intrinsic viscosity of 6 to 50 dl/g by the polymerization of ethylene using a catalyst comprising a solid catalyst component and an organometallic compound, characterized in that said solid catalyst component is a product obtained by contacting the following (A) and (B) together:

(A) the reaction product of a magnesium dihalide and a titanium compound represented by the general the range of 0.01 to 10 in terms of Al/Si mole ratio.

8. A process as set forth in claim 1, wherein the component (B) is used in an amount of 0.01 to 10 grams per gram of the component A.

9. A process as set forth in claim 1, wherein the polymerization is performed in the presence of an inert hydrocarbon, at a hydrogen concentration of 0 to 20 mole % at a temperature of 0° to 120° C., at a pressure of 0 to 70 kg/cm$^2$.G, and for a period of time sufficient for the formation of said ultra-high molecular weight polyethylene.

* * * * *